United States Patent Office 3,446,708
Patented May 27, 1969

3,446,708
MALT PELLETS
Clifford M. Hollenbeck and Robert E. Anderson, Manitowoc, Wis., assignors, by mesne assignments, to North American Corporation, Milwaukee, Wis., a corporation of Delaware
No Drawing. Filed Nov. 17, 1966, Ser. No. 595,021
Int. Cl. C12c 1/04; C12g 3/00
U.S. Cl. 195—70        10 Claims

ABSTRACT OF THE DISCLOSURE

A process in which fully germinated or modified green malt from thin or small sized barley kernels are shredded into fragments, the green wet fragments are reformed into pellets without heating, and the pellets are kilned to dryness to produce a complete brewing material. The reformed pellets may be coated with a suitable carbohydrate.

---

This invention relates to processes of producing malt. More particularly, this invention is concerned with a novel process of producing malt and malt-containing products which can be used by a brewer without milling or grinding, and/or the use of grain adjuncts and the products thereby produced. It is also concerned with producing usable malt from small kernel sized barley not normally used for malt of beverage quality.

In the production of alcoholic beverages such as beer and ale malt is generally used in conjunction with one or more grain adjuncts such as corn, rice, rye, sorghum, potato and wheat. On a dry basis, the adjuncts are generally from about 25% to 60% of the total grain bill with malt making up the rest of the 40% to 75%. The milled grain adjunct must first be cooked in water to gelatinize it. The resulting aqueous gelatinized solution is then combined with the malt in the mashing step. It would be advantageous to the brewer if he could eliminate the separate adjunct cooking step.

In the production of malt, barley is cleaned, steeped in water, germinated, and then kilned. The brewer then mills or grinds the malt to suitable size and employs it in the mashing step of beverage production. Malt supplies necessary enzymes, sugars, and flavor to the brewing process.

Brewery malt must meet rigid requirements set by the brewer. For example, because of grinding needs, brewers want malt of uniform kernel assortment. If the kernel size varies too much, trouble in grinding results because the large kernels are ground too fine and thin kernels too little or not at all. If the kernels are not ground enough, the malt extract decreases, and if found too fine filtering of the wort is slowed. Providing a malt of uniform quality which the brewer need not grind would obviously remove this problem and eliminate the need for tight control of the malt kernel assortment.

Brewers also want plump malt because it has higher extract than thin malt. This is because the husk, which does not contribute to the extract, constitutes a larger percentage by weight of a thin barley or malt kernel than it does of a plump kernel. The relationship between plump and thin malt kernels and the extract obtained therefrom can be arbitrarily shown in a representative manner as follows:

| Kernel grade | Percent extract |
|---|---|
| A. plump | 77.5 |
| B. ⎫ to | 76.5 |
| C. ⎭ | 75.5 |
| D. thin | 72.0 |

It is readily seen that by obtaining plump barley malt, the brewer obtains a product with higher extract yield than he would obtain from malt kernels of smaller size. The brewer's constant concern with obtaining a malt with high extract is primarily because brewing of beverages such as beer and ale utilizes essentially only those ingredients which are soluble in the wort. Materials in malt which do not dissolve contribute essentially nothing to the production of the final product.

The size of the malt kernels, whether they be plump, thin or of intermediate size, depends on the size of the barley kernels which are malted. The size of the resulting malt kernel increases proportionately with increase in size of the barley kernels which are malted. Accordingly, to produce plump malt kernels, one should employ plump barley kernels.

The available supply of barley in plump grades varies year-to-year, with perhaps only one out of four barley crop years in the United States giving large amounts of high quality plump kernels. In such good years, a large percentage of the barley crop may grade A and B according to the arbitrary scale set forth above. In three out of four years, however, the barley crop may grade essentially no higher than B, with much in C and D sizes, thus limiting the amount of plump barley available for malting. Plump barley normally commands a premium price, and in such years even the price of B grade barley in this arbitrary scale is high. Regardless of the crop year, the barley always contains some of the smaller kernels of sizes C and D. Size C is generally not suitable for use in brewing because of the resulting small kernel size, but it can be germinated to a high diastase content and be used suitably in distillery operations. The D size thin barley is normally too small to be used for either brewery or distillery malt. It is generally sieved out and sold at reduced price primarily for livestock feed.

Although the thinner grades of barley are only slightly used presently in brewing, they have inherent potential for this purpose. The thin grades are generally of sufficient germinating power to be malted and the resulting product has the capacity to supply all of the desired qualities found in malt from plump kernels. However, malt from thin or small kernel barley must be provided in a form acceptable to the brewer if it is to be used. Until now it has not been provided in a satisfactory form.

This invention provides a method of converting barley of any kernel size or assortment into a novel malt which a brewer can use. It also provides a method of producing a malt-containing complete brewing product which supplies all the carbohydrates needed in brewing and which can be used directly in the mashing step, advisably without prior grinding, cooking and/or the need to employ any grain adjuncts from other sources. In addition, this invention provides a method of converting thin or small kernel barley into malt which a brewer can use as a completely satisfactory replacement for malt from plump barley. Furthermore, the malt produced by this invention can be utilized by the brewer in the mashing step without, or with a minimum of, grinding. Thus, the process can be used in the malting of plump, as well as thin, barley where the resulting malt is to be supplied for use with no, or only slight, milling.

The process of this invention comprises taking green malt from the germination step of malting, shredding or chopping the green malt kernels into fragments, re-forming the fragments into pellets, and kilning the pellets to dryness. The resulting dried malt product is composed of a plurality of the fragments, including the husk, adhered together into discrete, friable, free-flowing, shape-retaining pellets readily disintegratable in the mashing step of beverage production.

The green malt used in practicing this invention can be produced by any suitable methods, such as those in commercial use. The green malt can be regular green malt with rootlets and acrospire. However, because the rootlets may adversely affect the flavor of beer, it is advisable sometimes at least, to dry the malt slightly, remove the rootlets by mechanical brushing, and remoisten the green malt before shredding. Most suitably employed in this invention, however, is malt germinatd (or modified) without rootlets according to some of the newer malting processes, as see U.S. Patent 3,085,945. Green malt produced using gibberellic acid or other growth stimulants can also be used in the invention.

After the germination period has been terminated the green malt can be shredded by any suitable means. There are many mechanical machines that can be used for this, including food blenders and meat grinders such as those which extrude the product through a perforated plate by means of a rotating knife in back of the plate. The main objective is to effect shredding of the kernels into fragments by efficient and economic means.

For good shredding and subsequent re-forming, the green malt advisably should have a moisture content of about 40 to 46%. Green malt with moisture levels above and below this range can be handled, but good shredding and re-forming are not usually as readily achieved.

The green malt should be shredded sufficiently so that the resulting fragments re-form well and adhere together into distinct pellets or balls. Care should be taken to avoid shredding the green malt too finely because, while fine particles re-form well into pellets and give good brewing performance, difficulty in lautering could result. It is well known that when malt is milled too fine the grains bed becomes too compact and the wort does not drain through it very well. Coarse shredding is also undesirable because coarse fragments do not adhere together well and consequently do not re-form as well into solid pellets or aggregates. Furthermore, with coarse fragments or particles there are less available solubles and lower brewhouse yields may occur. Clearly, the shredding should be effected to give sufficient coarse fragments, especially husk particles, for good lautering characteristics and, at the same time, sufficient fine particles to insure good re-forming into pellets and good brewhouse yields. Using the screen assorment analysis procedure as described in Example 1 infra, the particle or fragment size assortment for shredded green malt which presently appears to give particularly suitable results is as follows:

| Screen No. (U.S. standard): | Percent of wet residual green malt |
|---|---|
| 10 | 55–75 |
| 80 | 15–25 |
| 200 | 10–30 |

It is to be understood that considerable variation in particle size is acceptable in practicing the invention since particular brewers' practices, or nonbrewing uses of the malt, may most suitable be satisfied by shredding the green malt to other requirements than the screen assortment given above. The skill of the art should thus be employed so that the maltster shreds to his customers' needs.

Re-forming of the shredded green malt fragments can be effected by any suitable means, either in a batch process, or in a continuous process. The shredded green malt fragments tend to adhere to one another, and thus any means of moving them into contact with one another, such as tumbling them in a pan, rolling them down an incline, casting them into molds, or rubbing them together in a mixing device, will form pellets or aggregates suitable for this process. One suitable method is to feed the fragments into a revolving pan such as is used for tabletcoating, or into a revolving drum or cone. The important function in the re-forming step is to have the malt fragments tumble together, and form essentially homogeneous balls or pellets. As indicated above, the fragments adhere to one another due to their high moisture content andl the sticky nature of sugars and starches in the kernels. The shape of the pellets is not important, except that less breakage occurs due to attrition, when the product is dry, when the pellets are nearly spherical. To aid adherence of the fragments suitable additives can be applied, such as an aqueous dispersion of guar gum or locust bean gum. The reforming can also be accomplished by suitable molding or compressing devices similar to pellet mills.

Re-forming of the green malt fragments into pellets can be continued until the particles build up to any suitable size. Most suitably, re-forming is continued until the pellets are about ⅛ inch to ½ inch in diameter. Pellets below ⅛ inch are not conveniently produced with shredded particles having the desired screen assortment as specified above. In addition, when pellets larger than ½ inch are made, they dry slowly and are more susceptible to shattering when dry then smaller pellets.

It is a further feature of this invention to supply a complete brewing material and also to increase the malt extract, particularly when green thin malt is used, by including one or more added carbohydrates such as a starchy material, advisably gelatinized, or sugars with the green malt before or after shreadking or as the green malt fragments are being re-formed into pellets. Thus, aqueous suspensions of gelatinized potato flour, gelatinized cornflour, gelatinized barley flour, gelatinized wheat flour, and other gelatinized starches from grains, such as rye, sorghum and rice as well as aqueous solutions of dextrins, sucrose or glucose can be applied by any suitable means such as spraying or pouring the solution over the green malt or fragments thereof. Although gelatinizing the starch is not always necessary, gelatinizing the starchy material converts it to a form which permits it to be utilized more efficiently in the mashing step of beverage production. Gelatinized starchy materials are readily converted in mashing by enzymes in malt to fermentable sugars and protein fragments while ungelatinized starchy materials would only be slightly converted. Coating the green malt or fragments thereof during pelleting with ungelatinized starchy material would not increase the extract yield as much, or as easily, as does a gelatinized additive.

Gelatinized starch is readily produced by conventional methods, such as dispersing the starch in water and heating the slurry at about 80° C. or at such temperatures as are known in the art to be suitable for gelatinizing the particular starch employed, for sufficient time to effect gelatinization.

The amount of adjunct, such as a gelatinized starch or other carbohydrate such as dextrin or sugar, added to the green malt can be varied as desired. Of the total weight of the product the green malt, assuming 44% moisture, can constitute up to about 60% by weight and the adjunct up to about 40% by weight. After the product is dried the percentages shift, due to loss of moisture in the green malt, and become about 40% dried malt and 60% adjunct. Such a product can constitute a complete brewing material since on a dry basis a brewery normally uses at least 60% malt and up to 40% adjunct. The product can be used directly in mashing thus avoiding any need of cooking to gelatinize any starch adjunct used. Although the adjunct can constitute up to about 60% of the product on a dry basis, it is usually sufficient for a complete brewing material for the adjunct to constitute up to about 40% by weight of the product with the malt component being 60% or higher.

For those uses where the re-formed product is not to be employed as a complete brewing material, but will be supplemented by other brewable materials, and the main purpose of the adjunct is to increase extract yields the adjunct can be used in lesser amounts from a small amount such as about 1% up to 25% by weight or higher. However, for the sole purpose of increasing extract yields it is generally adequate to employ a maximum of 15% by weight on a dry basis. It is to be understood that since malt alone is a complete brewing material the inclusion of an adjunct does not make it less so, so that as used herein the product is considered a complete brewing material whether it contains no adjunct or up to 60% by weight adjunct on a dry basis.

The re-formed malt pellets, whether or not an adjunct component is included, are dried by kilning. The pellets usually dry faster than regular green malt, so the kilning time can be appreciably shortened with a saving in heat and better utilization of kilning space.

The re-formed malt pellets are ready for mashing in the brewery. The brewer need not mill the pellets prior to mashing, thus avoiding the problems of milling including mill setting variables, dustiness, and loss of grist flour.

The percentages given herein are by weight unless otherwise indicated.

The following examples are presented to illustrate the invention.

EXAMPLE 1

Rootlet-free green malt prepared by the mineral acid-gibberellic acid process of U.S. Patent No. 3,085,945 was shredded in a Toledo Food Chopper Model 5126. A four-bladed knife was used with stationary plates having 1/8", 3/16" and 1/4" holes. The shredded malt was tumbled at 30 r.p.m. in a coating pan for 30 minutes. It was then kilned at 110° F. for 20 hours; then at 180° F. for 3 hours. The product was dried, re-formed malt as rounded particles of 1/8 to 3/16 inch diameter.

Particle size assortment of the shredded green malt extruded through the 1/8, 3/16, 1/4 inch holes was as follows:

PERCENT OF RESIDUAL WET WEIGHT ON EACH OF FOUR SIEVES [1]

| Sieve (mesh) | Extruded thru 1/8" holes | Extruded thru 3/16" holes | Extruded thru 1/4" holes |
| --- | --- | --- | --- |
| 10 | 53.3 | 62.8 | 67.5 |
| 20 | 15.5 | 11.5 | 13.3 |
| 80 | 14.2 | 11.2 | 8.1 |
| 200 | 17.0 | 14.5 | 11.1 |

[1] Method of measuring the particle size assortment of the wet chopped malt: a 100 g. sample of shredded, but not tumbled, green malt is screened on 10, 20, 80, and 200 mesh sieves in succession. The malt is first dispersed in 500 ml. (50° C.) tap water and poured over the top sieve. Suction is applied and the malt washed vigorously with 50° C. tap water at least four times. Free water is drained from each wetted malt fraction on the sieves and then weighed. The weight is expressed as percent of residual wet weight.

The analyses of the kilned, re-formed malt samples (American Society of Brewing Chemists Methods) were as follows:

| Characteristic | 1/8" holes | 3/16" holes | 1/4" holes | Control—not shredded |
| --- | --- | --- | --- | --- |
| Moisture, percent | 3.0 | 3.2 | 3.0 | 4.5 |
| Extract, percent, dry basis (without further grinding) | 77.0 | 72.8 | 68.0 | [1] 73.5 |
| Color, °L | 1.88 | 1.99 | 2.31 | 2.2 |
| Soluble protein percent | 7.00 | 7.18 | 6.60 | 6.55 |

[1] Coarse grind.

The above re-formed malt samples were brewed in a pilot brewery with the following observations:

| | Re-formed malt product | | | Control |
| --- | --- | --- | --- | --- |
| | 1/8" holes | 3/16" holes | 1/4" holes | Regular brewery grind |
| Runoff time | Very slow | Medium | Fast | Medium. |
| Brewhouse yield | Good | Good | Poor | Good. |

EXAMPLE 2

Samples of rootlet-free green malt were shredded in the food chopper as in Example 1 and extruded through holes of 3/16 inch diameter. The shredded malt was re-formed into pellets by tumbling in a laboratory coating pan. The re-formed pellets were 1/8 to 1/2 inch in diameter. The reformed malt pellets were then dried by kilning. Control, nonshredded malt samples were dried simultaneously by the same heat source. The kilned, pelleted malt samples were brewed in a pilot brewery without further milling and compared to the controls milled in the usual manner.

Typical analyses of the control and re-formed pelleted samples are shown in the following table:

| | Control 1 | Re-formed malt pellets 1 | Control 2 | Re-formed malt pellets 2 |
| --- | --- | --- | --- | --- |
| Moisture, percent | 5.2 | 5.2 | 7.1 | 3.8 |
| Extract (dry-fine), percent | 77.8 | 79.0 | 78.7 | 79.7 |
| Protein, percent | 12.7 | 13.0 | 13.5 | 13.5 |
| Soluble protein, percent | 6.4 | 7.4 | 7.2 | 7.2 |
| Brewhouse yield, percent | 72.1 | 73.7 | 73.4 | 75.7 |
| Runoff time (minutes) | 75 | 71 | 110 | 106 |

EXAMPLE 3

The moisture level of shredded green malt affects the size and density of the tumbled aggregates or pellets. With green malt moisture of 46 to 49%, pellets of shredded green malt were extremely dense and dough-like with large diameters of 1/2 to 1 1/2 inches. Drying of this material was slow. With moisture of 40 to 46%, shredded green barley malt tumbled into compact smaller aggregates or pellets of 1/4 to 1/2 in. diameter which retained their shape after drying. The following table illustrates drying rates of smaller pellets compared to larger ones, and also shows that the re-formed malt is faster drying than regular malt.

| Re-formed malt pellets size | Drying bed depth, inches | Initial percent green malt moisture | Percent moisture loss after 4 1/2 hours kilning at 110° F. |
| --- | --- | --- | --- |
| Large—1/2" to 1" diameter | 5 | 46.5 | 12.1 |
| Small—1/8" to 1/2" diameter | 5 | 44.8 | 19.2 |
| Regular nonshredded malt | 5 | 46.5 | 10.0 |

EXAMPLE 4

Samples of rootlet-free green malt were shredded and re-formed into pellets on the 3 1/2, 4th, and 5th days of germination. The re-formed malt pellets and corresponding regular samples were dried, and analyzed for extract and soluble protein. The results are shown in the following table:

| Days germination | Percent fine grind extract | Percent soluble protein |
| --- | --- | --- |
| 3 1/2 days: | | |
| Malt Pellets | 79.3 | 6.70 |
| Control Malt | 77.6 | 6.39 |
| 4 days: | | |
| Malt Pellets | 79.3 | 6.78 |
| Control Malt | 77.8 | 6.58 |
| 5 days: | | |
| Malt Pellets | 79.9 | 7.22 |
| Control Malt | 78.0 | 6.93 |

The above results show that accelerated modification with increased soluble protein and increased extract occurs with the shredding and re-forming of the green malt into pellets.

EXAMPLE 5

One advantage of re-forming malt is the ease of incorporating extract materials into the shredded malt. Larker barley was malted for four days by the mineral acidgibberellic acid method of U.S. Patent 3,085,945. To the green malt were added individually pregelled barley starch or pregelled cornstarch at 5% levels of the weight of the green malt. The green malt with the adjuncts were individually blended, shredded through a plate having 3/16 inch holes, and re-formed as in Example 1.

The analyses of these supplemented malts (A.S.B.C. Methods) are as follows:

| Characteristic | Re-formed malt plus pre-gelled barley starch | Re-formed malt plus pre-gelled corn-starch | Re-formed malt—no adjunct | Whole malt control—not re-formed no additive |
|---|---|---|---|---|
| Moisture, percent | 3.8 | 3.0 | 3.9 | 6.7 |
| Extract (dry), percent | 80.2 | 80.8 | 79.7 | 77.9 (course); 78.7 (fine). |
| Soluble protein percent | 6.20 | 6.44 | 7.23 | 7.18. |
| Diastase, °L | 180 | 180 | 181 | 216. |

Barley flour (ungelled) was also added as an adjunct in the amount of 5% of the green malt weight, and the following results obtained:

| Characteristic | Re-formed malt plus barley flour | Control, not shredded, no barley flour |
|---|---|---|
| Moisture, percent | 2.2 | 5.5. |
| Extract (dry), percent | 78.2 (as is)(not ground further). | 76.9 (course grind). |
| Brewhouse data: | | |
| Runoff time | 105.5 | 88. |
| Yield | Very good | Good. |

The following are data of shredded, re-formed malt with glucose added before shredding:

| | Control not re-formed | Re-formed malt plus 2.5% glucose | Re-formed malt, control |
|---|---|---|---|
| Extract (dry), percent | 77.6 (fine gr.) | 77.8 (unground) | 73.7 (unground); 77.1 (fine gr.). |
| Moisture, percent | 9.2 | 8.6 | 9.2. |
| Diastase, °L | 235 | 216 | 204. |
| Total protein, percent | 11.96 | 13.08 | 13.43. |
| Soluble protein, percent | 6.50 | 6.82 | 6.59 |

Malts, in the form of syrup and flour, were also successfully used as adjuncts.

EXAMPLE 6

One kilogram of regular Larker A green malt with rootlets was shredded by passing through the chopper of Example 1. The plate with 3/16" holes was used. Following re-forming of the particles into pellets, the malt was kilned using a routine brewer's drying schedule. A non-shredded rooted malt control was dried simultaneously.

The malts analyzed as follows:

| | Malt | |
|---|---|---|
| Characteristic | Re-formed malt pellets | Nonshredded control rooted malt |
| Moisture, percent | 3.1 | 6.6 |
| Extract, percent (dry, fine gr.) | 7.88 | 76.4 |
| Diastatic power, °L | 144 | 217 |
| Alpha amylase units | 35.4 | 51.4 |

EXAMPLE 7

Rootlets were removed from 1000 g. of a conventional four-day germinated brewer's malt by drying and mechanical brushing. Following removal of most rootlets, the malt was re-steeped to 44% moisture (from 32%) and then shredded.

After re-forming as in Example 1, the malt was kilned, and analyzed as follows:

| | Malt | |
|---|---|---|
| Characteristic | Malt pellets shredded after rootlet removal | Nonshredded control |
| Moisture, percent | 8.3 | 4.9 |
| Extract, percent (dry, fine gr.) | 73.7 | 74.4 |
| Diastatic power, °L | 127 | |
| Alpha amylase units | 37.4 | |

EXAMPLE 8

Green, rootless malt was processed with a Rietz Disintegrator (Model RA 1-4K311 powered with a 2 HP motor). Ten blades were used, rotating counterclockwise and surrounded by a screen. The shredded product was collected beneath, beyond the circular screen. The holes in the screen were 1/4", and the speed of rotation was 4940 r.p.m. To 8000 g. of the shredded malt was added 100 g. of pre-gelled cornstarch. The blend was then tumbled to re-form the mixture into green malt pellets. Malt moisture was 44.8%. Kilning was at 110° F. for 20 hours. The control was kilned simultaneously.

Assortment of the re-formed green malt was as follows:

| Screen mesh size: | Percent retained on each screen |
|---|---|
| 10 | 56.1 |
| 20 | 6.6 |
| 80 | 11.2 |
| 200 | 26.1 |

The analyses of the re-formed malt product and control were as follows:

| Analysis | Malt pellets (kilned) (Rietz shredded) | Nonshredded control (kilned) |
|---|---|---|
| Moisture, percent | 4.4 | 4.5 |
| Extract, percent (dry fine gr.) | 80.0 | 79.2 |
| Brewhouse analysis: | | |
| Runoff time | Good | Good |
| Yield | Good | Good |

EXAMPLE 9

A re-formed malt product was prepared with a relative high level of added adjunct to simulate a complete mesh bill for the brewing of beer, all in one product. Conceivably, such a re-formed malt product would be used in brewery mashing without milling, and without adding any other grain or carbohydrate material.

A re-formed malt product was prepared as in Example 5, from a C grade barley. Prior to shredding thru a plate with 3/16 inch holes in the Toledo Food Chopper, the green malt was mixed with a mass of pre-gelled brewers corn grits at the level of 2112 g. of corn grits (dry basis) to 6300 g. of green malt. The grits were gelled by suspending them in 4000 ml. of water and cooking in an autoclave for 60 minutes at 200° F. The green malt and pre-gelled corn grits were mixed well, shredded, and re-formed into pellets 1/8 inch to 1/2 inch in diameter in a laboratory coating pan. The re-formed product was dried in the usual manner by kilning.

The malt-adjunct product converted well during mashing in a pilot brewery. Based on dry weights, it represented a 67% malt and 33% corn product with a laboratory extract of 79.9% compared to a laboratory extract of 75.0% for the malt by itself.

Any suitable method of producing the green malt can be used in practicing this invention. There is nothing critical about producing the green malt and those skilled in the art are aware of many variations which are used according to the type of barley malted and the type of beer to be produced. One method of making the green malt comprises steeping the barley 30–50 hours at about 50–55°

F. until its moisture content reaches 39–44%. The barley can then be germinated 4–5 days at 60° F. with aeration.

Any typical kilning cycle can be used after reforming the green malt. One suitable kilning cycle can be: 12 hours at 120° F., 4 hours at 140° F., 4 hours at 160° F., 2 hours at 180° F. and 2 hours at 190° F. Other time periods and temperatures can be used to obtain malts desired for certain brewing characteristics, such as flavor and color. In any event the kilning is usually continued until the moisture content has been reduced to around 4%.

Various changes and modifications of the invention can be made and, to the extent that such variations incorporate the spirit of this invention, they are intended to be included within the scope of the appended claims.

What is claimed is:

1. The process which comprises:
   shredding whole fully germinated or modified green malt kernels into fragments;
   re-forming the fragments, without prior heating, into pellets; and
   kilning the pellets to dryness to produce a complete brewing material.

2. The provess of claim 1 in which 50 to 75% by weight of the wet fragments from the green malt are retained by a No. 10 screen.

3. The process of claim 1 in which the green malt fragments formed by shredding have a particle size assortment, before pelleting, as follows:

| Screen No.: | Percent of fragments on screen |
|---|---|
| 10 | 50–75 |
| 80 | 15–25 |
| 200 | 10–30 |

4. The process of claim 1 in which the pellets of green malt fragments have about a ⅛ inch to ½ inch major dimension.

5. The process of claim 1 in which an edible carbohydrate additive material is either applied (1) to the surface of the whole green malt kernels before shredding; or
(2) to the shredded fragments after they are formed; or
(3) to a combination of procedures (1) and (2).

6. The process of claim 5 in which the edible carbohydrate additive material is a gelatinized carbohydrate material.

7. The process of claim 5 in which the amount of additive material used constitutes up to 60% by weight of the pellets after kilning.

8. Malt produced by the process of claim 1, comprising a plurality of fragments of fully germinated or modified malt kernels, including the husk, adhered together without prior heating of the fragments into discrete, friable, free flowing shape retaining dry pellets constituting a complete brewing material readily disintegratable in the mashing step of beverage production.

9. Malt pellets according to claim 8 including an edible carbohydrate additive material constituting up to 60% by weight of the dry pellets.

10. Malt pellets according to claim 9 in which the additive is a gelatinized carbohydrate material.

References Cited

UNITED STATES PATENTS

| 2,726,957 | 12/1955 | Kunz | 99—52 |
| 3,030,279 | 4/1962 | De Ryhove et al. | 195—70 |
| 3,048,489 | 8/1962 | Blum | 195—70 |
| 3,054,676 | 9/1962 | Lauhoff et al. | 99—50 |

A. LOUIS MONACELL, *Primary Examiner.*

N. ROSKIN, *Assistant Examiner.*

U.S. Cl. X.R.

99—50

UNITED STATES PATENT OFFICE
CERTIFICATE OF CORRECTION

Patent No. 3,446,708				May 27, 1969

Clifford M. Hollenbeck et al.

It is hereby certified that error appears in the above numbered patent requiring correction and that the said Letters Patent should read as corrected below.

Column 3, line 9, "germinatd" should be -- germinated --; line 45, "assorment" should be -- assortment --; line 58, "suitable" should be -- suitably --. Column 4, line 3, "and1" should be -- and --; line 20, "then" should be -- than --; line 26, "shreadding" should be -- shredding --. Column 5, line 35, insert -- or -- before "1/4". Column 6, line 70, place a hyphen (-) after "acid", first occurrence. Column 7, about line 10, in column 2, below "6.20" the "180" should be --181 --; line 50, "7.88" should be -- 78.8 --. Column 8, line 47, "mesh" should be -- mash --.

Signed and sealed this 2nd day of September 1969.

(SEAL)
Attest:

EDWARD M.FLETCHER,JR.				WILLIAM E. SCHUYLER, JR.
Attesting Officer				Commissioner of Patents